US011651374B2

(12) United States Patent
Singh

(10) Patent No.: US 11,651,374 B2
(45) Date of Patent: May 16, 2023

(54) CHECK VALIDATION AND CLEARANCE

(71) Applicant: Wells Fargo Bank, N.A., San Francisco, CA (US)

(72) Inventor: Manpreet Singh, Guwahati (IN)

(73) Assignee: Wells Fargo Bank, N.A., San Francisco, CA (US)

( * ) Notice: Subject to any disclaimer, the term of this patent is extended or adjusted under 35 U.S.C. 154(b) by 53 days.

(21) Appl. No.: 16/783,980

(22) Filed: Feb. 6, 2020

(65) Prior Publication Data

US 2021/0248609 A1    Aug. 12, 2021

(51) Int. Cl.
| | |
|---|---|
| *G06Q 20/00* | (2012.01) |
| *G06Q 20/40* | (2012.01) |
| *G06Q 20/04* | (2012.01) |
| *G06Q 40/02* | (2023.01) |
| *G06V 30/416* | (2022.01) |

(52) U.S. Cl.
CPC ....... *G06Q 20/4016* (2013.01); *G06Q 20/042* (2013.01); *G06Q 20/403* (2013.01); *G06Q 40/02* (2013.01); *G06V 30/416* (2022.01)

(58) Field of Classification Search
CPC .......... G06Q 20/4016; G06Q 20/042
USPC ....................................... 705/45
See application file for complete search history.

(56) References Cited

U.S. PATENT DOCUMENTS

| | | | |
|---|---|---|---|
| 8,800,866 B1 * | 8/2014 | Gromley | G07F 19/202 235/375 |
| 11,062,294 B2 * | 7/2021 | Jain | G06Q 20/14 |
| 2015/0117748 A1 * | 4/2015 | Smith | G06V 30/416 382/137 |
| 2020/0184211 A1 * | 6/2020 | Fowles | G06F 3/04845 |

FOREIGN PATENT DOCUMENTS

WO    WO-2019212843 A1 * 11/2019 ........... G06F 16/951

OTHER PUBLICATIONS

The effect of automated teller machine use on customer account balances: A field test Haynes, Ray Meredith. Arizona State University, ProQuest Dissertations Publishing, 1988. 8907704 https://search.proquest.com/docview/303691646/3D1663836429405DPQ/1?accountid=14753 (Year: 1988).*
Endorsing a Check the Right Way at the Right Time. By Mercie Geffner. https://money.usnews.com/banking/articles/endorsing-a-check-the-right-way-at-the-right-time (Year: 2019).*

(Continued)

*Primary Examiner* — Bruce I Ebersman
*Assistant Examiner* — Hatem M Ali
(74) *Attorney, Agent, or Firm* — Schwegman Lundberg & Woessner, P.A.

(57) ABSTRACT

Checks provided to payees by payers can be subject to evaluation. Evaluation includes assessing check validity, for instance by comparing data extracted from a check with data supplied by a financial institution. Evaluation can further comprise determining check clearance probability in view of financial and other credit features of a payer. Results of a validity assessment and a clearance probability computation can provide a basis for generation and communication of recommended action including whether or not to accept a check.

17 Claims, 8 Drawing Sheets

(56) References Cited

OTHER PUBLICATIONS

Cameron, Sean M.:Dissertation or Thesis: Employment credit checks: Through the lens of organizational justice and workplace discrimination; Southern Illinois University at Carbondale. ProQuest Dissertations Publishing, 2014. 3684677. (Year: 2014) (Year: 2014).*
Abernathy, William Butler; Dissertation or Thesis: Case Studies in Organizational Behavior Modification .: The Ohio State University. ProQuest Dissertations Publishing, 1978. 7812312. (Year: 1978) (Year: 1978).*
Guan, Jian; Scholarly Journal: A Model for Investigating Internal Control Weaknesses; Communications of the Association for Information Systems; Atlanta vol. 31, (2012): 3. DOI:10.17705/1CAIS.03103 (Year: 2012) (Year: 2012).*
Cameron, Sean M.:Dissertation or Thesis: Employment credit checks: Through the lens of organizational justice and workplace discrimination; Southern Illinois University at Carbondale. ProQuest Dissertations Publishing, 2014. 3684677. (Year: 2014) (Year: 2014) (Year: 2014).*
Abernathy, William Butler; Dissertation or Thesis: Case Studies in Organizational Behavior Modification I: The Ohio State University. ProQuest Dissertations Publishing, 1978. 7812312. (Year: 1978) (Year: 1978) (Year: 1978).*
Authors: N.R. Sunitha et al; Title: Secure e-Cheque Clearance between Financial Institutions; IEEE Xplore; Last Update Date: Oct. 25, 2008; Publication Date: Jul. 1, 2007 (Year: 2008).*
Authors: Gaurav Sharma et al; Title: Physical Security Aspects of E-Cash; Last Update Date: Jul. 24, 2014; Publication Date: Apr. 1, 2014 (Year: 2014).*

* cited by examiner

CHECK VALIDATION AND CLEARANCE

BACKGROUND

Transactions can involve presentation of a check by a consumer in exchange for goods or services of a merchant. A check is a written instrument on a demand deposit account that directs a financial institution to pay a specified sum of money from a payer to a payee. The merchant can accept a check and negotiate for cash or deposit funds into an account. Funds can be transferred from a first financial institution of the consumer to a second financial institution of the merchant. Further, a consumer account is debited for the amount of the check and a merchant account is credited the same amount to complete the transaction.

Acceptance of a check by a merchant at a point of sale results in the merchant, or any other payee, accepting risks associated with promised funds not being paid. For instance, there is a risk of loss if there are insufficient funds in the account of the consumer to cover the promised amount. Moreover, there is also a risk of loss due to fraud. For example, a check can be counterfeit, forged, written on a closed account, or altered in some manner, among other things, which causes a paying financial institution not to honor the check. By continuing to accept checks, a merchant bears a risk of loss associated with this instrument.

SUMMARY

The following presents a simplified summary to provide a basic understanding of some aspects of the disclosed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, the subject disclosure pertains to check evaluation. Check evaluation comprises validation and clearance assessment. Data extracted from a check can be used as a basis for determining whether the check is valid or invalid, for instance based on comparison of check data with bank data to determine whether the check was issued from a legitimate account. Clearance assessment can also be performed to determine likelihood that the check would clear or be honored. Many factors can be considered in determining this probability such as accounts, account value, and credit history, among other things. The determined likelihood can be embodied as a score that can be compared to one or more thresholds to determine a result of the clearance assessment, including accepting or rejecting a check. Notification can be generated and communicated regarding results of check evaluation such as whether a check is valid or invalid and whether or not the check should be accepted or rejected, among other things.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the disclosed subject matter. Other advantages and novel features may become apparent from the following detailed description when considered in conjunction with the drawings.

DETAILED DESCRIPTION

Check fraud is one of the largest challenges facing financial institutions today. Advances in counterfeiting technology have made it increasingly easy to create realistic counterfeit checks used to defraud banks and other businesses. Conventional methods of reducing check fraud include providing watermarks on the checks, fingerprinting non-customers that seek to cash checks, positive pay systems and reverse positive pay systems. Although these check fraud security systems have been somewhat effective in deterring check fraud, they suffer from a multiplicity of drawbacks. For example, these systems are generally very slow and prohibitively expensive. Further, conventional systems do not evaluate the certainty of a check being processed and payment being credited to payee's account.

Details provided herein generally pertain to evaluation of a check issued by a payer to a payee. Check evaluation can validate the authenticity of a check and predict the probability of the check being honored. Data can be extracted from a check such as account number, name of the payer, signature, issue date, and amount, among other things, and compared against bank data to determine validity of the check. If the check is determined to be counterfeit, expired, or issued in the name of a closed account, the check can be deemed invalid and a payee can be notified of the invalidity. Further, a probability that the check will be honored can be determined based on information such as account statement, automatic payment features configured in the payer's account, credit history and other financial related information. The probability can be captured as a score and compared to thresholds to determine a recommended response that could save a payee from having a check bounce. If the score is acceptable, the payee can be notified to accept the check but otherwise reject the check. Additionally or alternatively, a recommendation can be provided such as to acquire overdraft protection to guard against failure of a check to clear.

Various aspects of the subject disclosure are now described in more detail with reference to the annexed drawings, wherein like numerals generally refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

Figure 1:
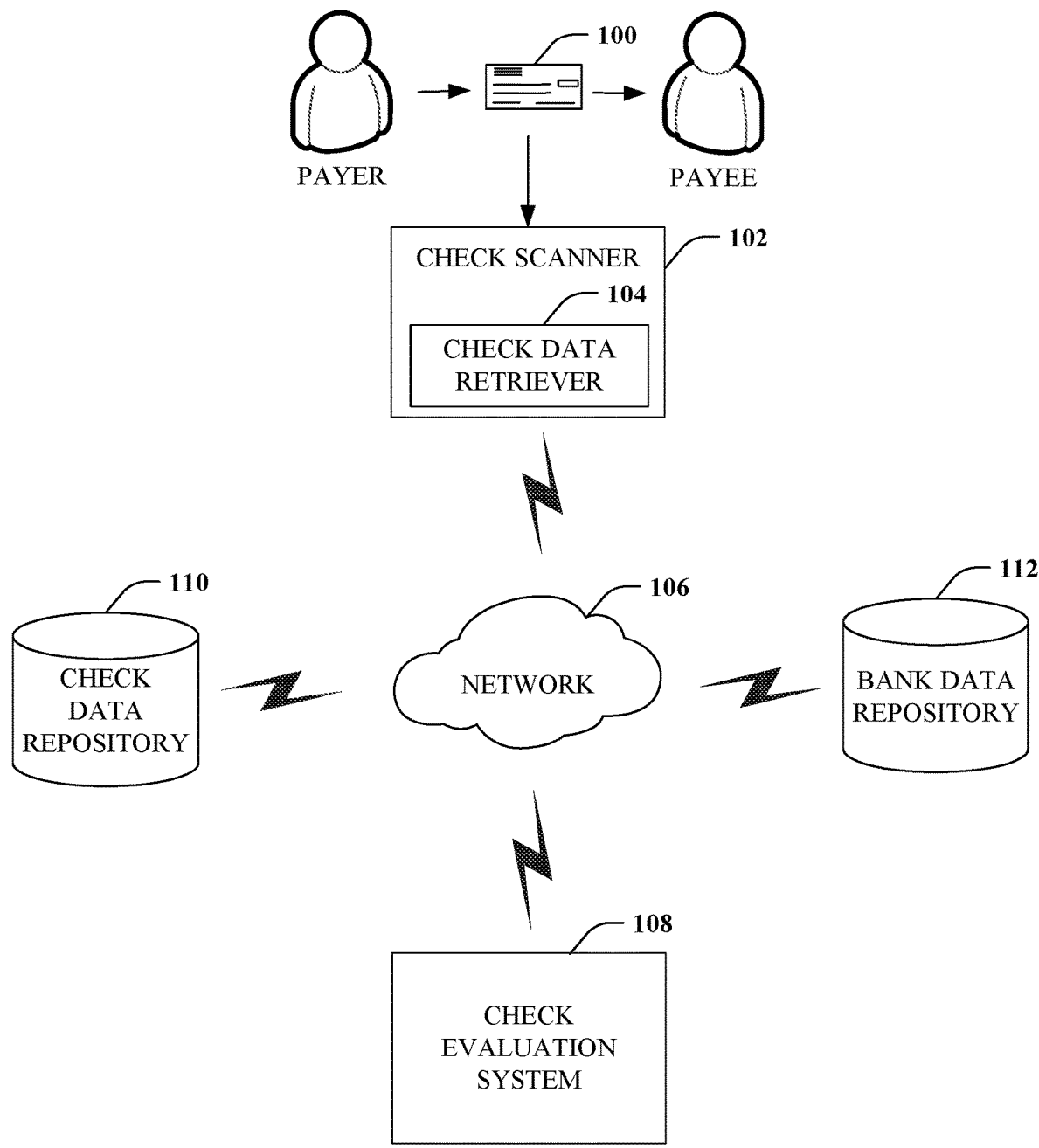
FIG. 1 illustrates an overview of an example implementation.

Referring initially to FIG. 1, a high-level overview of an example implementation is illustrated and described. As depicted, a payer presents a check 100 to a payee in exchange for goods or services provided by the payee, for example at a point of sale. Blindly accepting this check exposes the payee to risk of loss, such as a fee, negative credit impact, and loss of available funds, among other things, should the check be fraudulent or rejected at deposit due to insufficient funds. Accordingly, prior to acceptance of the check, the payee provides the check 100 to the check scanner 102 that produces an image representation of the check 100 from which check data, or check demographics, are extracted from the image by way of the check data-retriever component 104. Among other things, the check data can include payee name, payer name, amount, endorsement, date, check number, routing number, and account number. The check scanner 102 can correspond to a piece of scanning hardware connected to a point of sale system or an application or service that exploits built-in scanning associated with a computing device (e.g., smart phone) configured for payment processing. The check data can be transmitted over the network 106, such as the Internet, to the check evaluation system 108. Alternatively, an image of the check provided by the check scanner 102 can be transmitted to the check evaluation system 108, which can perform data retrieval prior to subsequent processing.

The check evaluation system 108 can analyze the check 100 and return a recommended action to the payee such as accept or reject the check 100. The check evaluation system 108 can return a response in near real time to the payee to facilitate efficient transaction processing as well as allow alternative payment arrangements to be made to complete a transaction should the check be rejected. The check evaluation system 108 can acquire data from various sources to facilitate analysis such as the check data repository 110 and the bank data repository 112.

The check data repository 110 and the bank data repository 112 can correspond to one or more hardware devices such as a magnetic hard drive connected to a computing device such as a server. The check data repository can include information regarding valid checks. In one instance, checks received from the scanner 102 can be initially saved to the check data repository, which can be accessed by the check evaluation system 108. The bank data repository 112 can include financial information associated a payer issuing the check. The bank data repository 112 can be maintained with input from banks or other financial institutions. In one instance, the bank data repository can be maintained by a bank. Alternatively, an interface can be provided across banks or other financial institutions to acquire and store data in the repositories. Additional repositories can also be utilized to facilitate processing such as a separate payer repository comprising financial profiles of payers.

In accordance with one aspect, the check evaluation system 108 can seek to validate the check 100. In furtherance thereof, the check evaluation system 108 can compare check data to data stored in the bank data repository 112 or other repositories. For example, the check data can be compared to determine if the check is associated with a legitimate bank and account with an available check number. Further, a determination can be made as to whether an account associated with the check is open and active based on comparison of routing and account numbers with those received from one or more of the bank data repository 112. Further, analysis can be performed in furtherance of check validation. For instance, security features of the check 100 can be evaluated in addition to verifying proper endorsement and non-expiration, among other things.

According to another aspect, the check evaluation system 108 can seek to determine a likelihood that the check will clear or be honored by a depository bank on which the check is drawn. In other words, a probability can be computed with respect to the likelihood that sufficient funds are available to satisfy the check. Factors for consideration can include profile data of a payer such as financial activity, credit score, and account balances, among other things. In one instance, such information can be received from the bank data repository 112.

A score can be computed by the check evaluation system 108 based on results of the validation and clearance likelihood. One or more thresholds can be set, and recommendations determined based on comparison of the score to the thresholds. For example, if the score indicates that the check 100 is invalid, the recommendation can be to reject the check 100. Alternatively, if the score indicates the check is valid and there is a high probability that the check will be honored, the recommendation can be to accept the check 100. Other recommendations are also possible. For example, based on the score a recommendation can be provide to acquire overdraft coverage or the like to protect against loss. Further, a recommendation can be determined and provided as to the best time to deposit the check that maximizes the likelihood of the check being honored based on a constructed or inferred financial profile of the payer.

Figure 2:
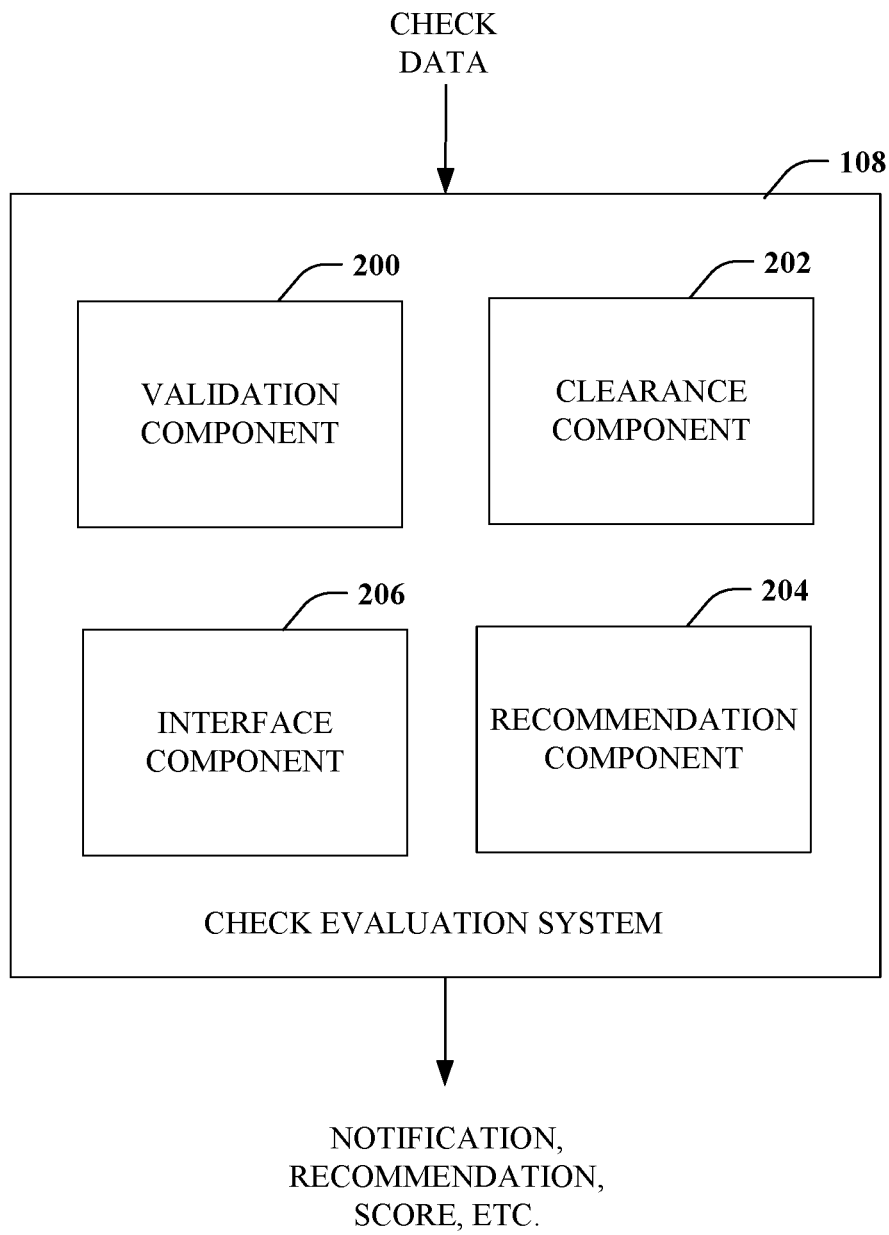
FIG. 2 is a schematic block diagram of a check evaluation system.

FIG. 2 illustrates a check evaluation system 108 in further sample detail. The check evaluation system 108 receives, as input, check data including data extracted from a check subject to evaluation as well as data regarding the check from one or more repositories or entities. Here, the check is a written instrument associated with a demand deposit account that directs payment of a specified sum of money from a payer to a payee. Output can be a notification, recommendation, or score, for example, capturing a result of check evaluation. In one instance, the check evaluation system 108 returns a result in near real time to facilitate point of sale transactions. The check evaluation system 108 can include validation component 200, clearance component 202, recommendation component 204, and interface component 206.

The validation component 200 is configured to evaluate the validity or authenticity of an input check. The validation component 200 can receive, retrieve or otherwise obtain or acquire check data or demographics regarding the input check, such as check number, account number, amount data, signature of the payer, check date, and other information. The validation component 200 can compare the check data with bank data from the bank of the payer in an attempt to identify a match or mismatch, wherein a match evinces validity and a mismatch is indicative of invalidity. For example, the validation component 200 can seek to match the account number to an open and active account as well as match the payee name to the account. As another example, an attempt can be made to match the endorsement to an endorsement on file for the account. Further, the validation component 200 can compare the check date to the current date to determine if the check has expired based on comparison to an expiration threshold (e.g., 180 days). As another example, the validation component 200 can seek to verify security features of a check such as watermarks. If check data does not match bank data, is expired, drawn on a closed or non-operational bank or account, or fails security feature checks, the check can be deemed invalid. Alternatively, a check can be deemed valid. In accordance with one embodiment, the interface component 206 can notify the payee whether the check provided is deemed valid or invalid.

The clearance component 202 is configured to determine the likelihood or probability a check will clear or be honored. Typically, a valid check is honored if sufficient funds are present in the payer's account to cover the amount of the check. Conversely, lack of funds to satisfy the check can result in the check not clearing or being honored, which is problematic for the payee but not dispositive. To address this scenario, the clearance component 202 receives, retrieves, or otherwise obtains or acquires payer profile data such as an account statement, credit history, configuration of automatic payment features, along with credit or financial information associated with the payer. In one instance, such data can be acquired from one or more repositories, such as the bank data repository 112 of FIG. 1. Based on this information, the clearance component 202 can predict the likelihood that an input check will be honored. The payee can determine whether or not to accept the check based on his likelihood in view of risk tolerance of the payee.

Figure 3:
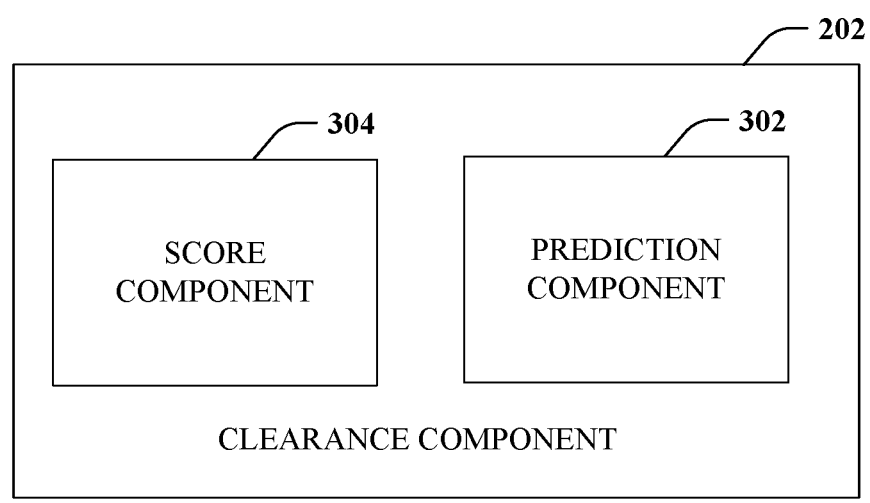
FIG. 3 is a schematic block diagram of a sample clearance component.

Turning attention briefly to FIG. 3, a sample clearance component 202 is illustrated in further detail. As shown, the clearance component includes subcomponents, namely prediction component 302 and score component 304. The prediction component 302 is configured to evaluate payer information and predict or determine likelihood that a check from the payer will be honored. The prediction component 302 can be configured to derive data from other data to facilitate prediction. For instance, credit score can be obtained or computed based on credit history. Additionally, an outstanding balance amount in a checking account can be extracted from an account statement. Based on acquired or derived payer profile data, the prediction component 302 can produce a result.

If a check is issued for an amount that is not available in a corresponding checking account, there is a substantial likelihood that the check will not clear. Nevertheless, the account may be credited an amount that would cover the check between the time of purchase and the time the check is presented to a bank for payment. Accordingly, the presumption that the check will not clear can be overcome based on consideration of additional factors. In one instance, a history of check payment can be considered. For example, if every check a payer drafted in the last year was paid without issue, there is a higher likelihood of the check clearing than if multiple checks were bounced. Further, if the user has multiple accounts, such as a checking account and a savings account, the total balance may be considered. In this scenario, if the total of two or more account balances equals or exceeds the check amount, the likelihood that the check will clear increases, especially if the one account is linked to another account for overdraft protection.

One or more results produced by the prediction component 302 can be converted into a score by the score component 304. In one instance, the score can be representative of the likelihood that a check will clear or be honored. For example, a score of eighty on a scale of one hundred can indicate there is an eighty percent chance the check will be honored. Similarly, a score of eight on a scale of ten can indicate the same chance of being honored.

Returning to FIG. 2, the recommendation component 204 can be employed to determine a recommended or suggested action. In accordance with one aspect, the recommendation component 204 can determine action based on a score returned by the clearance component 202 in view of one or more predetermined thresholds. In one instance, a payee can configure the thresholds to express their sensitivity to risk of loss. For example, a threshold can be set to eighty-five to indicate that scores above eighty-five are acceptable while scores equal to or less than eighty-five are unacceptable. The recommendation can be to accept or reject a check similar to the way a credit card can be approved or declined. Alternatively, the recommendation component 204 can determine beneficial actions for the payee to perform, such as acquiring overdraft protection, or a loan based on the check score. As another example, the recommendation component 204 can identify an optimal deposit time that maximizes the likelihood of the check being cleared. For instance, scores can be computed at various times, such as days, and the largest score would be indicative of the optimal time. The score differences can predict balances based on historical deposits and withdrawals.

The interface component 206 is a mechanism for communicating results and recommendations of the check evaluation systems 108 back to a payee in response to submission of an input check for analysis. The interface component 206 can employ one or more of a plurality of communication mediums including, but not limited to, application alert, text message, or voice message. In accordance with one embodiment, the payee can employ a bank application to scan and submit checks for evaluation. In this situation, the interface component 206 can trigger a notification in the bank application, such as valid or invalid, or accept or reject.

The validation component 200 and the clearance component 202 can operate in a dependent or independent manner. In one embodiment, the validation component 200 can be triggered initially to determine whether a check is valid or invalid. If the validation component 200 determines the check is invalid, this can be communicated by way of the interface component 206 and evaluation terminated. Alternatively, if the validation component 200 deems the check valid, functionality of the clearance component 202 can be triggered. In another implementation, both components can be triggered independently to evaluate the check. In one instance, a result of the validation component 200 can be a component of a score determined by the clearance component 202.

The aforementioned systems, architectures, platforms, environments, or the like have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component to provide aggregate functionality. Communication between systems, components and/or sub-components can be accomplished in accordance with either a push and/or pull control model. The components may also interact with one or more other components not specifically described herein for sake of brevity, but known by those of skill in the art.

Various portions of the disclosed systems above and methods below can include or employ artificial intelligence, machine learning, or knowledge or rule-based components, sub-components, processes, means, methodologies, or mechanisms (e.g., support vector machines, neural networks, expert systems, Bayesian belief networks, fuzzy logic, data fusion engines, classifiers . . . ). Such components, among others, can automate certain mechanisms or processes performed thereby to make portions of the systems and methods more adaptive as well as efficient and intelligent. The check evaluation system 108 can employ such mechanisms in a variety of ways.

By way of example, and not limitation, the clearance component 202 can utilize machine-learning mechanisms to predict the likelihood that a check would be honored. In one instance, a machine-learning model can be trained with a plurality of checks labeled as honored or not. In this manner, the machine learning model can learn features associated with whether or not a check will be honored or not and weights corresponding to the relative significance of the features. In this manner, patterns or trends can be identified that may not have otherwise been known and utilized to make an intelligent prediction. For example, a particular mark or memo text could be determined to be significant in identifying a counterfeit check.

Further, it is conceivable that a factor utilized by the clearance component 202 to compute the likelihood that the check will be honored may be missing. In this case, artificial-intelligence-based mechanisms can be employed to predict the factor based on other factors and historical values. The likelihood can then be computed based on this predicted factor.

The validation component 200 can also utilize such mechanisms. For example, a machine learning classifier can be employed with respect to security features of checks. A model can be trained to identify the presence or absence of one or more security features or whether or not tampering occurred with respect to a feature. The model can subsequently be employed by the validation component 200 to determine check authenticity.

In view of the exemplary systems described above, methods that may be implemented in accordance with the disclosed subject matter will be better appreciated with reference to flow chart diagrams of FIGS. 4-7. While for purposes of simplicity of explanation, the methods are shown and described as a series of blocks, it is to be understood and appreciated that the disclosed subject matter is not limited by the order of the blocks, as some blocks may occur in different orders and/or concurrently with other blocks from what is depicted and described herein. Moreover, not all illustrated blocks may be required to implement the methods described hereinafter. Further, each block or combination of blocks can be implemented by computer program instructions that can be provided to a processor to produce a machine, such that the instructions executing on the processor create a means for implementing functions specified by a flow chart block.

Figure 4:
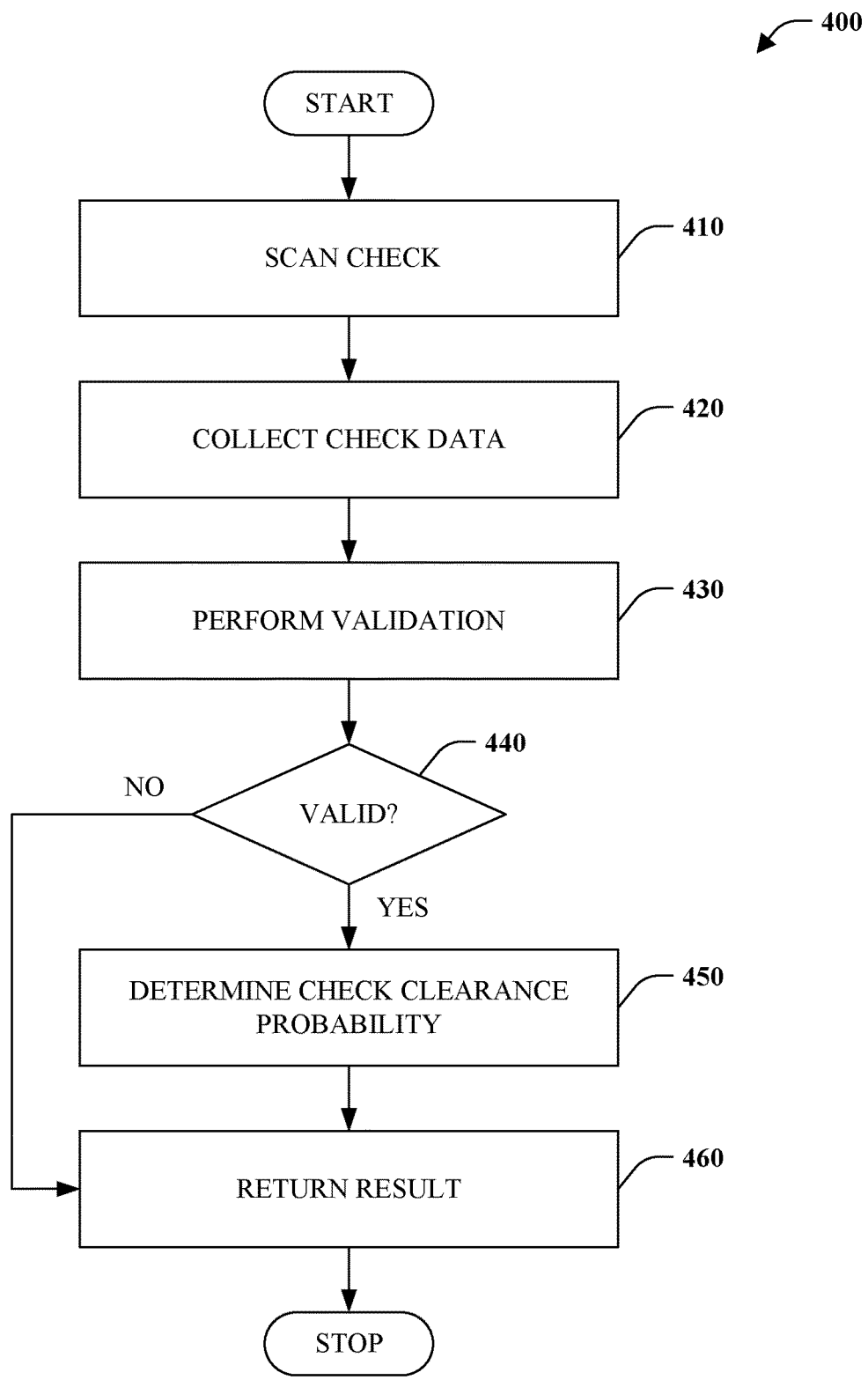
FIG. 4 is a flow chart diagram of a method of check evaluation.

FIG. 4 illustrates a method 400 of check evaluation. The method 400 can be performed by the check evaluation system 108 and various components thereof. At numeral 410, a check is scanned. For instance, an image or other representation of a check is captured. At 420, check data or demographics are collected from the scanned check. For example, text can be extracted from the check such as payer name, date, check amount, and routing and account numbers, among other things.

At reference numeral 430, validation of the check is performed. The validation can involve examining various features of a check. In one instance, validation can involve verifying check data. For example, an account number in the check data can be compared with bank data of the same bank as a payer. If there is a match, the match supports a valid check determination. By contrast, a mismatch suggests the check may be invalid. Other processes can be performed with respect to validating a check. As an example, expiry of a check can be determined by comparing the check date to the current date and an expiration threshold. The check can be classified as invalid, if check is expired. As another example, validation can involve determining whether an account associated with the check is open and operational as opposed to closed and non-operational. Validation can also involve checking for the presence of or tampering with security features of the check. At 440, a determination is made as to whether the check is deemed valid or not. If the check is invalid ("NO"), the method proceeds to 460, where the result of validation is returned. If the check is valid ("YES"), the method continues at 450.

At reference numeral 450, check clearance probability is determined. In other words, the likelihood that a check will be honored can be computed. In one instance, financial and credit data is acquired or derived to produce a payer profile. Such data can include financial history, account information including account statement, configured automatic payment features, credit history, or other credit related information. Likelihood that a check will be cleared can be determined based on the payer profile. For example, the likelihood would be high for a payer with a good credit history and money in an account to cover the check. By contrast, the likelihood that the check will be honored would be lower for a payer with credit history issues and an account with insufficient funds to cover the check. At reference 460, a result can be returned such as the check clearance probability or a score or recommendation associated with the probability.

Figure 5:
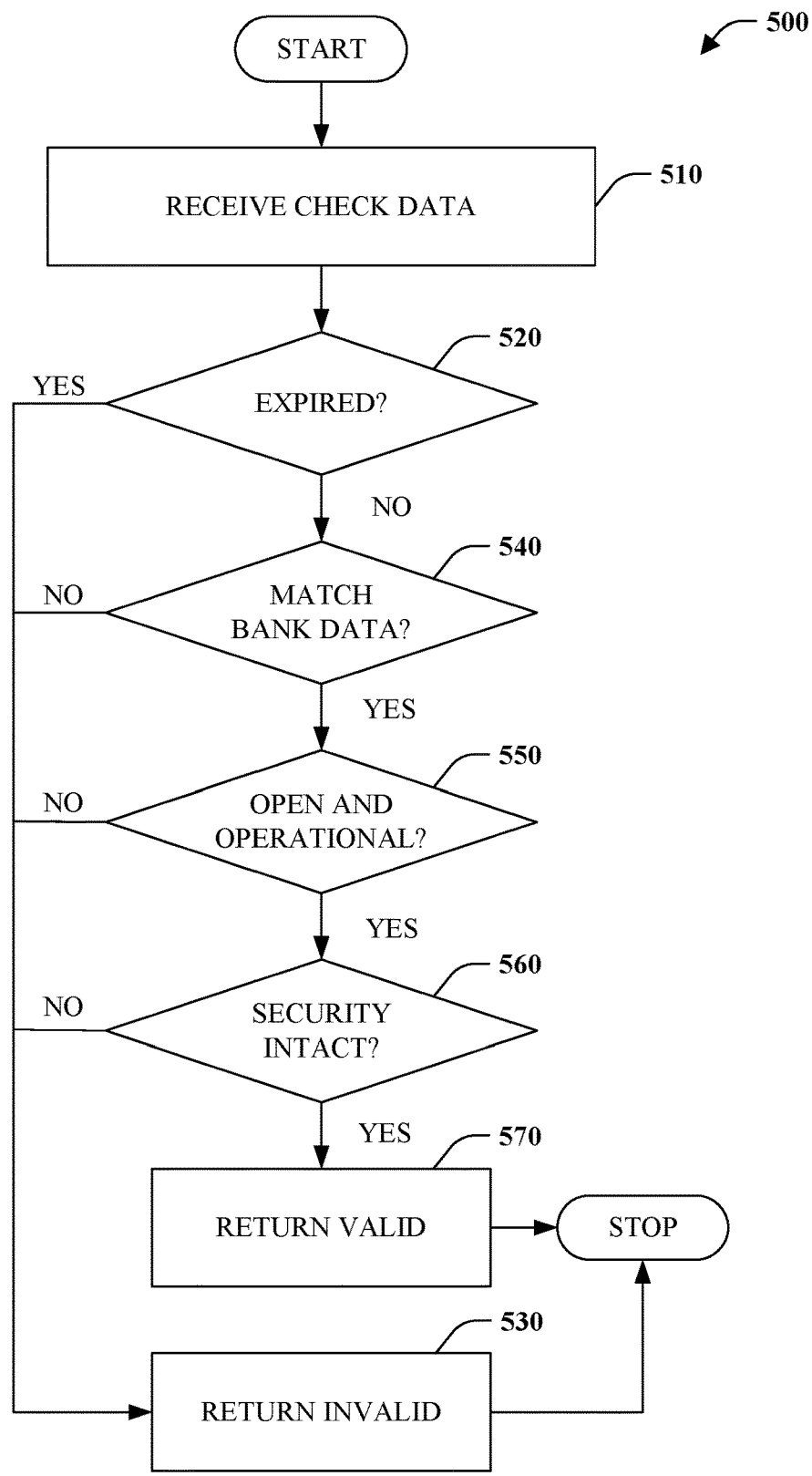
FIG. 5 is a flow chart diagram of a method of check validation.

FIG. 5 depicts a check validation method 500 in accordance with an aspect of the subject disclosure. In one instance, the method 500 can be performed by the validation component 300. At reference numeral 510, check data is received. For instance, the check data can be extracted from an image of the check. The check data can include account number, bank name, payer name, data, amount, and endorsement, among other things.

At 520, a determination is made as to whether the check has expired or not. Checks can expire after a period of time such as one hundred and eighty days. Age of the check can be computed as the difference between the check date and the current date. The age can then be compared with an expiration period to determine whether or not the check is expired. If the check is expired ("YES"), the method proceeds at 530, where invalid is returned as the status. If the check has not expired ("NO"), the method continues at reference numeral 540.

At numeral 540, a determination is made as to whether the check data matches bank data. For example, it can be determined whether the bank identified on the check exists, has an account number specified by the check, and an available check number. If the check data does not match, or is a mismatch, ("NO"), the check status is returned as invalid at 530. Alternatively, if the check data does match the bank data ("YES"), the method continues at 550.

At 550, a determination is made as to whether the check refers to an account that is open and operational as opposed to closed or frozen. The check data can include bank and account number. This information can be utilized and compared with bank data indicating whether or not the account is open and operational. If the account is not open and operational ("NO"), the method proceeds to 530 where the check status of invalid is returned. By contrast, if the account is deemed open and operational ("YES"), the method continues at numeral 560.

Security features are analyzed at 560 to determine whether or not they are intact. In other words, a determination is made as to whether or not the check security features are present and not violated. Features associated with checks of a particular bank can be determined from bank data and utilized to verify at least the presence of such features. In some instances, the features can be technology based such as use of a hologram, watermark, or heat sensitive ink, among others. In at least one instance, the security can correspond to the number of signatures required on a check. Enterprises can require more than one endorsement, and in some cases, the number of required endorsements is based on the amount of the check. Accordingly, number of signatures present can be compared to the number required. If the security is not intact ("NO"), the method returns invalid as the check status at 530. Alternatively, if the security is intact ("YES"), the method returns valid as the status at 570.

Figure 6:
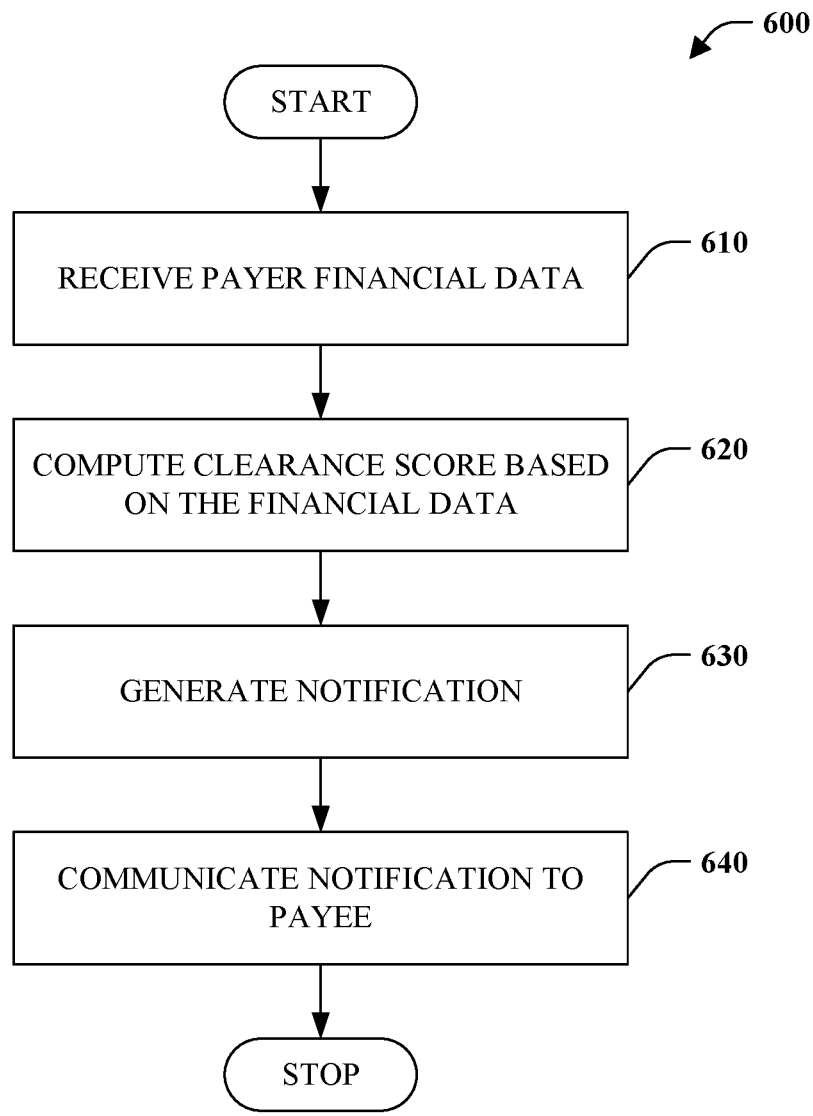
FIG. 6 is a flow chart diagram of a check clearance method.

FIG. 6 is a flow chart diagram of a check clearance method 600. The method 600 can be performed by the clearance component 202 in one implementation. At numeral 610, payer financial data can be received. In one instance, an interface can be provided to acquire the financial data from the payer's bank.

At 620, a clearance score is computed based on the data. The clearance score represents the likelihood or probability that a check will clear or be honored. Such a determination involves considering many factors to improve the accuracy of the score. In one instance, current balance of a checking account can be considered. However, lack of funds in the account is not dispositive. In other words, the mere fact that a checking account does not currently have funds to satisfy the check will not automatically result in a low score and a recommendation to reject the check. Other factors can be considered such as those concerning ability to pay. For example analyzing the payer financial data can reveal another account of the payer with sufficient funds. Further, history of honoring checks can be considered such as a ratio of checks accepted versus rejected. For example, if all checks issued within the last year, or other period of time, were honored, lack of current funding in a checking account is less of a concern. Similarly, a high credit score can also offset at least in part the fact that funds are not currently available. In other words, a combination of factors can be considered when determining likelihood that the check will be honored as opposed to a single factor such as current checking account balance.

At 630, a notification can be generated based on the clearance score. The notification can be a recommendation as to how a payee should response to presentation of a check from a payer. For example, it can be recommended that the payee accept or reject the check. Other recommendations can be provided regarding the best time to deposit the check that maximizes the probability that the check will be honored. In this situation, timing of credits (e.g., paychecks) and debits (e.g., automatic bill pay . . . ) to an account can be learned from historical financial information and utilized to determine a deposit time with a high probability a particular check being honored. In another instance, the recommendation can suggest that the payee should seek overdraft coverage or a loan if the check is accepted to mitigate risk of loss based on a risk score.

Once generated, the notification can be communicated to the payee at reference numeral 640. One or more of a plurality of communication mediums can be employed in this regard. For example, the notification can be provided as an application alert, for example in an application associated with check evaluation. Alternatively, text messaging can be utilized to communicate the notification. In fact, substantially any medium can be utilized to supports communication with a payee.

Figure 7:
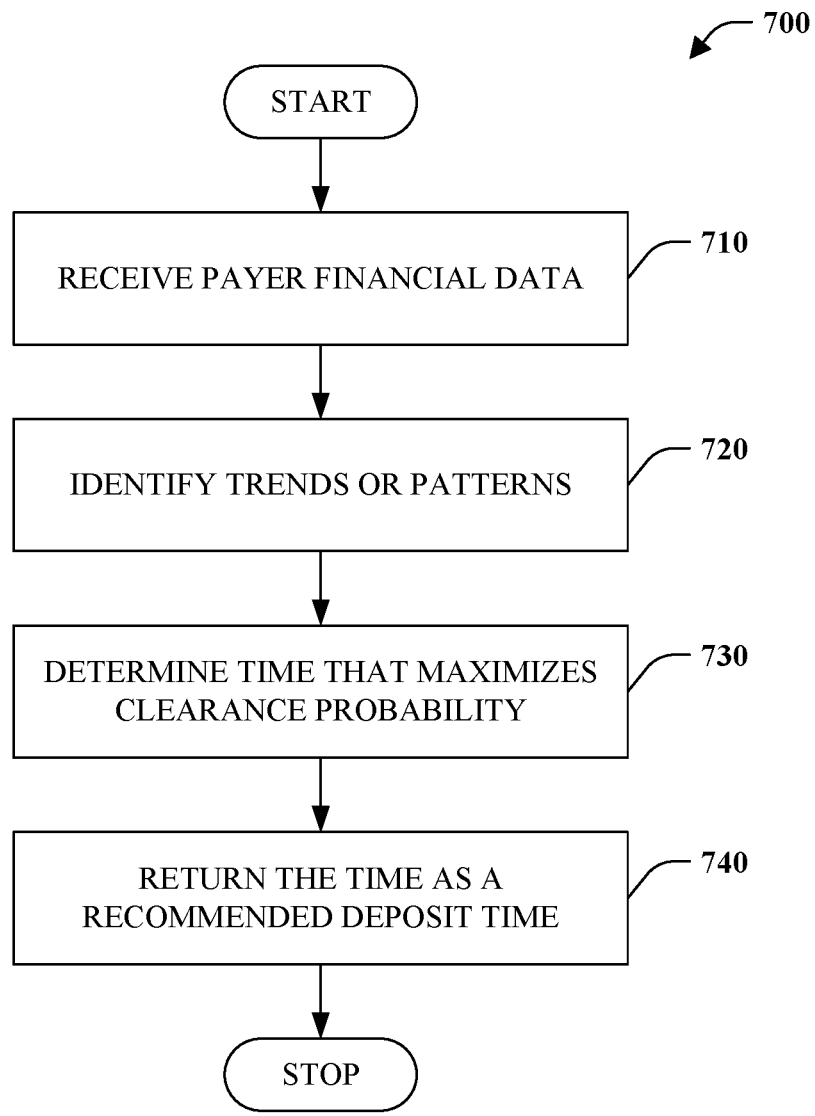
FIG. 7 is a flow chart diagram of deposit recommendation.

FIG. 7 is a flow chart diagram of a deposit recommendation method 700. The method 700 can be implemented by the check evaluation system 108, for instance as part of recommendation component 204. At reference numeral 710, payer financial data is received. The financial data can capture financial transactions associated with one or more financial institution accounts, among other things. The financial data can be acquired by way of financial institution interface. At numeral 720, machine learning or statistical analysis can be employed to identify trends or patterns with respect to the financial data. For example, it can be determined that the payer is paid by an employer bi-weekly on particular days as well as identify amounts and timing regarding automatic bill pay. At 730, a time can be determined that maximizes check clearance probability based on identified trends or patterns. For instance, a day can be identified after the payer is paid by an employer and before automatic bill payments are processed. At 740, the determined time is returned as a recommended check deposit time. In one instance, the deposit time can be provided in conjunction with a notification to the payer to accept a check.

Aspects of the subject disclosure concern a technical problem of identification of valid and honorable demand deposit account instruments in view of advances in counterfeiting technology. The problem is solved by extracting payer information from an instrument and seeking to validate the instrument based on data acquired from a bank, among other things. Further, financial and credit information can be acquired and utilized as a basis for predicting a probability that an instrument will be honored.

The subject disclosure provides for various products and processes that are configured to perform check evaluation including validation and check clearance probability and functionality related thereto. What follows are one or more example systems and methods.

A system comprises a processor coupled to a memory that includes instructions that when executed by the processor cause the processor to: assess validity of a check based on data extracted from the check; determine a score capturing a probability that the check will be honored, after the check is deemed valid; generate a notification based on the validity of the check and the score; and communicate the notification in response a request associated with the data extracted from the check. Assessing validity of the check can further comprise determining whether the check issued from an open and active account of a known financial institution, verifying security features of the check, or ensuring the check is properly endorsed. The instructions can further cause the processor to determine the score based on financial history of a payer, current account balance, or estimated account balance upon deposit in view of automatic payments. In one instance, the notification can indicate that check is invalid. In another instance, the notification can be a recommendation not to accept the check based on the score in comparison to a predetermined threshold. In yet another instance, the notification can be a recommendation to acquire overdraft protection prior to depositing the check based on the score in comparison to a predetermined threshold.

A method comprises executing, on a processor, instructions that cause the processor to perform operations comprising: evaluating validity of the check based on data extracted from the check; computing a score capturing a probability that the check will be honored, after the check is deemed valid; generating a notification based on the validity of the check and the score; and communicating the notification in response a request associated with the data extracted from the check. The operations further comprise extracting the data from a scanned image of the check. Evaluating the validity of the check further comprises determining whether the check issued from an open and active account. Evaluating the validity of the check further comprises verifying one or more security features of the check. The operations further comprise computing the score based on one of financial history or credit history of a payer, or current account balance. The operations further comprise predicting the score at different times in view of automatic deposits and withdraws, determining the time associated with highest score, and generating the notification comprises a recommendation of a deposit time with a high probability that the check will be honored.

A method comprises receiving a scanned image of a check for evaluation from a payee, extracting data from the image of the check, evaluating validity of the check based on account data and comparison with open and active accounts, computing a score capturing a probability that the check will be honored, after the check is deemed valid, based on financial information of a payer, generating a notification based on one of the validity of the check or the score indicating whether to accept or reject the check, and communicating the notification to the payee. The method further comprises notifying the payee to reject the check after determining the check to be invalid. The method further comprises computing the score based on estimated account balance at a predicted time of deposit.

As used herein, the terms "component" and "system," as well as various forms thereof (e.g., components, systems, sub-systems . . . ) are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The conjunction "or" as used in this description and appended claims is intended to mean an inclusive "or" rather than an exclusive "or," unless otherwise specified or clear from context. In other words, "'X' or 'Y'" is intended to mean any inclusive permutations of "X" and "Y." For example, if "'A' employs 'X,'" "'A employs 'Y,'" or "'A' employs both 'X' and 'Y,'" then "'A' employs 'X' or 'Y'" is satisfied under any of the foregoing instances.

Furthermore, to the extent that the terms "includes," "contains," "has," "having" or variations in form thereof are used in either the detailed description or the claims, such terms are intended to be inclusive in a manner similar to the term "comprising" as "comprising" is interpreted when employed as a transitional word in a claim.

Figure 8:
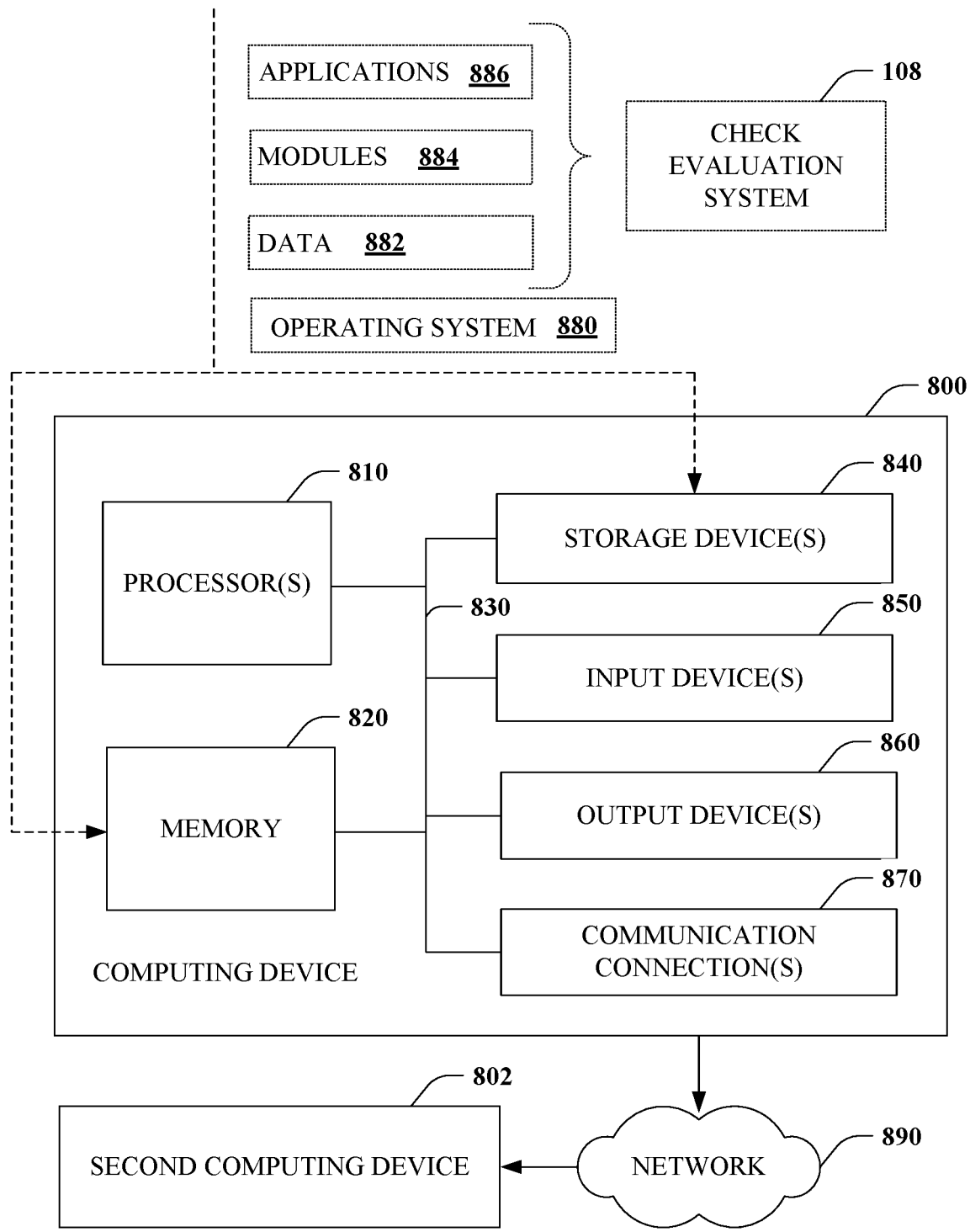
FIG. 8 is a schematic block diagram illustrating a suitable operating environment for aspects of the subject disclosure.

To provide a context for the disclosed subject matter, FIG. 8 as well as the following discussion are intended to provide a brief, general description of a suitable environment in which various aspects of the disclosed subject matter can be implemented. The suitable environment, however, is solely an example and is not intended to suggest any limitation as to scope of use or functionality.

While the above disclosed system and methods can be described in the general context of computer-executable instructions of a program that runs on one or more computers, those skilled in the art will recognize that aspects can also be implemented in combination with other program modules or the like. Generally, program modules include routines, programs, components, data structures, among other things that perform particular tasks and/or implement particular abstract data types. Moreover, those skilled in the art will appreciate that the above systems and methods can be practiced with various computer system configurations, including single-processor, multi-processor or multi-core processor computer systems, mini-computing devices, server computers, as well as personal computers, hand-held computing devices (e.g., personal digital assistant (PDA), smart phone, tablet, watch . . . ), microprocessor-based or programmable consumer or industrial electronics, and the like. Aspects can also be practiced in distributed computing environments where tasks are performed by remote processing devices that are linked through a communications network. However, some, if not all aspects, of the disclosed subject matter can be practiced on stand-alone computers. In a distributed computing environment, program modules may be located in one or both of local and remote memory devices.

With reference to FIG. 8, illustrated is an example computing device 800 (e.g., desktop, laptop, tablet, watch, server, hand-held, programmable consumer or industrial electronics, set-top box, game system, compute node . . . ). The computing device 800 includes one or more processor(s) 810, memory 820, system bus 830, storage device(s) 840, input device(s) 850, output device(s) 860, and communications connection(s) 870. The system bus 830 communicatively couples at least the above system constituents. However, the computing device 800, in its simplest form, can include one or more processors 810 coupled to memory 820, wherein the one or more processors 810 execute various computer executable actions, instructions, and or components stored in the memory 820.

The processor(s) 810 can be implemented with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 810 may also be implemented as a combination of computing devices, for example a combination of a DSP and a microprocessor, a plurality of microprocessors, multi-core processors, one or more microprocessors in conjunction with a DSP core, or any other such configuration. In one embodiment, the processor(s) 810 can be a graphics processor unit (GPU) that performs calculations with respect to digital image processing and computer graphics.

The computing device 800 can include or otherwise interact with a variety of computer-readable media to facilitate control of the computing device to implement one or more aspects of the disclosed subject matter. The computer-readable media can be any available media that is accessible to the computing device 800 and includes volatile and nonvolatile media, and removable and non-removable media. Computer-readable media can comprise two distinct and mutually exclusive types, namely storage media and communication media.

Storage media includes volatile and nonvolatile, removable and non-removable media implemented in any method or technology for storage of information such as computer-readable instructions, data structures, program modules, or other data. Storage media includes storage devices such as memory devices (e.g., random access memory (RAM), read-only memory (ROM), electrically erasable programmable read-only memory (EEPROM) . . . ), magnetic storage devices (e.g., hard disk, floppy disk, cassettes, tape . . . ), optical disks (e.g., compact disk (CD), digital versatile disk (DVD) . . . ), and solid state devices (e.g., solid state drive (SSD), flash memory drive (e.g., card, stick, key drive . . . ) . . . ), or any other like mediums that store, as opposed to transmit or communicate, the desired information accessible by the computing device 800. Accordingly, storage media excludes modulated data signals as well as that described with respect to communication media.

Communication media embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media.

The memory 820 and storage device(s) 840 are examples of computer-readable storage media. Depending on the configuration and type of computing device, the memory 820 may be volatile (e.g., random access memory (RAM)), non-volatile (e.g., read only memory (ROM), flash memory . . . ) or some combination of the two. By way of example, the basic input/output system (BIOS), including basic routines to transfer information between elements within the computing device 800, such as during start-up, can be stored in nonvolatile memory, while volatile memory can act as external cache memory to facilitate processing by the processor(s) 810, among other things.

The storage device(s) 840 include removable/non-removable, volatile/non-volatile storage media for storage of vast amounts of data relative to the memory 820. For example, storage device(s) 840 include, but are not limited to, one or more devices such as a magnetic or optical disk drive, floppy disk drive, flash memory, solid-state drive, or memory stick.

Memory 820 and storage device(s) 840 can include, or have stored therein, operating system 880, one or more applications 886, one or more program modules 884, and data 882. The operating system 880 acts to control and allocate resources of the computing device 800. Applications 886 include one or both of system and application software and can exploit management of resources by the operating system 880 through program modules 884 and data 882 stored in the memory 820 and/or storage device(s) 840 to perform one or more actions. Accordingly, applications 886 can turn a general-purpose computer 800 into a specialized machine in accordance with the logic provided thereby.

All or portions of the disclosed subject matter can be implemented using standard programming and/or engineering techniques to produce software, firmware, hardware, or any combination thereof to control the computing device 800 to realize the disclosed functionality. By way of example and not limitation, all or portions of the check evaluation system 108 can be, or form part of, the application 886, and include one or more modules 884 and data 882 stored in memory and/or storage device(s) 840 whose functionality can be realized when executed by one or more processor(s) 810.

In accordance with one particular embodiment, the processor(s) 810 can correspond to a system on a chip (SOC) or like architecture including, or in other words integrating, both hardware and software on a single integrated circuit substrate. Here, the processor(s) 810 can include one or more processors as well as memory at least similar to the processor(s) 810 and memory 820, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the check evaluation system 108 and/or functionality associated therewith can be embedded within hardware in a SOC architecture.

The input device(s) 850 and output device(s) 860 can be communicatively coupled to the computing device 800. By way of example, the input device(s) 850 can include a pointing device (e.g., mouse, trackball, stylus, pen, touch pad . . . ), keyboard, joystick, microphone, voice user interface system, camera, motion sensor, and a global positioning satellite (GPS) receiver and transmitter, among other things. The output device(s) 860, by way of example, can correspond to a display device (e.g., liquid crystal display (LCD), light emitting diode (LED), plasma, organic light-emitting diode display (OLED) . . . ), speakers, voice user interface system, printer, and vibration motor, among other things. The input device(s) 850 and output device(s) 860 can be connected to the computing device 800 by way of wired connection (e.g., bus), wireless connection (e.g., Wi-Fi, Bluetooth . . . ), or a combination thereof.

The computing device 800 can also include communication connection(s) 870 to enable communication with at least a second computing device 802 by means of a network 890. The communication connection(s) 870 can include wired or wireless communication mechanisms to support network communication. The network 890 can correspond to a local area network (LAN) or a wide area network (WAN) such as the Internet. The second computing device 802 can be another processor-based device with which the computing device 800 can interact. For example, the computing device 800 can form part of a network service platform that exposes the check evaluation system 108 as a service to the second computing device 802. In one implementation, the second computing device 802 can execute merchant point of sale functionality that can communicate with computing device 800 to evaluate checks received from customers.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims.

What is claimed is:

1. A system, comprising:
   a processor coupled to a memory that includes instructions that when executed by the processor cause the processor to:
   train a machine learning model with a plurality of data indicating whether or not checks of a plurality of previous checks are valid or invalid such that the machine learning model is trained to determine when a future check is valid or invalid based on the plurality of data, wherein training the machine learning model includes:

the machine learning model learning first features associated with a first previous check of the plurality of checks that was valid based on the plurality of data;

the machine learning model learning second features associated with a second previous check of the plurality of checks that was invalid based on the plurality of data; and the machine learning model identifying patterns based on the first features and the second features in order to predict if the future check is valid or invalid, wherein the machine learning model is trained to identify a mark or memo text associated with the check to determine if the check is counterfeit using one of a Bayesian belief network, fuzzy logic, or a data fusion engine;

establish a communication link with a payee over an area network, the communication link utilizing a bank application;

receive, from a scanning device via the bank application, data extracted from a check issued by a payer to the payee, wherein the extracted data corresponds to scanned data extracted from an image of the check and the extracted data is received via the communication link and the bank application;

assess a validity of the check issued by the payer to the payee based on the data extracted from the check issued by the payer to the payee using the trained machine learning model, wherein assessing includes comparing the data extracted from the check to financial institution data and a match is indicative of validity and a mismatch is indicative of invalidity;

determine a score capturing a probability that the check issued by the payer to the payee will be honored after the check issued by the payer to the payee is deemed valid;

predict the score at different times in view of automatic deposits and withdraws;

determine the time associated with highest score;

generate a notification based on the validity of the check issued by the payer to the payee and the score, the notification indicating whether or not the check should be accepted and including a recommendation of a deposit time with a high probability that the check will be honored; and communicate the notification to the payee of the check via the communication link over the area network and the bank application such that the notification indicating whether or not the check should be accepted is caused to be presented via the bank application.

2. The system of claim 1, wherein the instructions, when executed by the processor, further cause the processor to assess the validity of the check by determining whether the check issued from an open and active account of a known financial institution.

3. The system of claim 1, wherein the instructions, when executed by the processor, further cause the processor to assess the validity of the check by verifying one or more security features of the check.

4. The system of claim 1, wherein the instructions, when executed by the processor, further cause the processor to assess the validity of the check by ensuring the check is properly endorsed.

5. The system of claim 1, wherein the instructions, when executed by the processor, further cause the processor to determine the score based on a financial history of a payer.

6. The system of claim 1, wherein the instructions, when executed by the processor, further cause the processor to determine the score based on a current account balance.

7. The system of claim 1, wherein the instructions, when executed by the processor, further cause the processor to determine the score based on an estimated account balance upon deposit in view of automatic payments.

8. The system of claim 1, wherein the notification indicates that the check is invalid.

9. The system of claim 1, wherein the notification is a recommendation to reject the check based on the score in comparison to a predetermined threshold.

10. The system of claim 1, wherein the notification is a recommendation to acquire overdraft protection prior to depositing the check based on the score in comparison to a predetermined threshold.

11. A method, comprising:

executing, on a processor, instructions that cause the processor to perform operations comprising:

training a machine learning model with a plurality of data indicating whether or not checks of a plurality of previous checks are valid or invalid such that the machine learning model is trained to determine when a future check is valid or invalid based on the plurality of data, wherein training the machine learning model includes:

the machine learning model learning first features associated with a first previous check of the plurality of checks that was valid based on the plurality of data;

the machine learning model learning second features associated with a second previous check of the plurality of checks that was invalid based on the plurality of data; and the machine learning model identifying patterns based on the first features and the second features in order to predict if the future check is valid or invalid, wherein the machine learning model is trained to identify a mark or memo text associated with the check to determine if the check is counterfeit using one of a Bayesian belief network, fuzzy logic, or a data fusion engine;

establishing a communication link with a payee over an area network, the communication link utilizing a bank application;

receiving, from a scanning device via the bank application, data extracted from a check issued by a payer to the payee, wherein the extracted data corresponds to scanned data extracted from an image of the check and the data is received via the communication link and the bank application;

evaluating a validity of the check issued by the payer to the payee based on the data extracted from the check issued by the payer to the payee using the trained machine learning model, wherein evaluating includes comparing the data extracted from the check to financial institution data and a match is indicative of validity and a mismatch is indicative of invalidity;

computing a score capturing a probability that the check issued by the payer to the payee will be honored, after the check issued by the payer to the payee is deemed valid;

predicting the score at different times in view of automatic deposits and withdraws;

determining the time associated with highest score;

generating a notification based on the validity of the check issued by the payer to the payee and the score, the notification indicating whether or not the check should be accepted and including a recommendation of a deposit time with a high probability that the check will be honored; and communicating the notification via the communication link over an area network and the bank application such that the notification indicating whether or not the check should be accepted is caused to be presented via the bank application.

12. The method of claim 11, wherein evaluating the validity of the check further comprises determining whether the check issued from an open and active account.

13. The method of claim 11, wherein the operations further comprise computing the score based on one of a financial history or a credit history of a payer.

14. The method of claim 11, wherein the operations further comprise computing the score based on a current account balance.

15. A method, comprising:
training a machine learning model with a plurality of data indicating whether or not checks of a plurality of previous checks are valid or invalid such that the machine learning model is trained to determine when a future check is valid or invalid based on the plurality of data, wherein training the machine learning model includes:
the machine learning model learning first features associated with a first previous check of the plurality of checks that was valid based on the plurality of data;
the machine learning model learning second features associated with a second previous check of the plurality of checks that was invalid based on the plurality of data;
the machine learning model identifying patterns based on the first features and the second features in order to predict if the future check is valid or invalid, wherein the machine learning model is trained to identify a mark or memo text associated with the check to determine if the check is counterfeit using one of a Bayesian belief network, fuzzy logic, or a data fusion engine;
establishing a communication link with a payee over an area network, the communication link utilizing a bank application;
receiving a scanned image of a check issued by a payer to a payee for evaluation from the payee via the bank application;
extracting data from the image of the check issued by the payer to the payee;
evaluating a validity of the check issued by the payer to the payee based on account data and comparison with open and active accounts using the trained machine learning model, wherein evaluating includes comparing the data extracted from the image of the check to financial institution data and a match is indicative of validity and a mismatch is indicative of invalidity;
computing a score capturing a probability that the check issued by the payer to the payee will be honored, after the check based on the plurality of data is deemed valid, based on financial information of the payer;
predicting the score at different times in view of automatic deposits and withdraws;
determining the time associated with highest score;
generating a notification based on one of the validity of the check based on the plurality of data or the score indicating whether to accept or reject the check issued by the payer to the payee and including a recommendation of a deposit time with a high probability that the check will be honored; and
communicating the notification to the payee via the established communication link over an area network and the bank application such that the notification indicating whether or not to accept or reject the check is caused to be presented via the bank application.

16. The method of claim 15, further comprising notifying the payee to reject the check after determining the check to be invalid.

17. The method of claim 15, further comprising computing the score based on estimated account balance at a predicted time of deposit.

* * * * *